Jan. 3, 1933.                C. H. FOX                1,893,166
                             FIRE ENGINE
              Original Filed Nov. 14, 1930    2 Sheets-Sheet 1

Inventor
                              CHARLES H. FOX,
                              Toulmin & Toulmin
                                        Attorneys Jan. 3, 1933.  C. H. FOX  1,893,166
FIRE ENGINE
Original Filed Nov. 14, 1930  2 Sheets-Sheet 2

CHARLES H. FOX, Inventor
By Toulmin & Toulmin
Attorneys

Patented Jan. 3, 1933

1,893,166

UNITED STATES PATENT OFFICE

CHARLES H. FOX, OF CINCINNATI, OHIO, ASSIGNOR TO THE AHRENS-FOX FIRE ENGINE COMPANY, OF CINCINNATI, OHIO, A CORPORATION OF OHIO

FIRE ENGINE

Original application filed November 14, 1930, Serial No. 495,653. Divided and this application filed October 26, 1931. Serial No. 571,025.

This invention relates to improvements in fire engines, and particularly to means for supporting suction hose on the side of the body of a fire engine.

It is the object of this invention to provide improved means for supporting a suction hose on the side of the truck, this means consisting of a device for supporting the hose in such a manner that it may be removed by merely withdrawing and turning to one side a clamping means.

These and other objects and advantages will appear from the following description taken in connection with the drawings.

This application is a division of my co-pending application Ser. No. 495,653, filed November 14, 1930.

Referring to the drawings.

Figure 2:
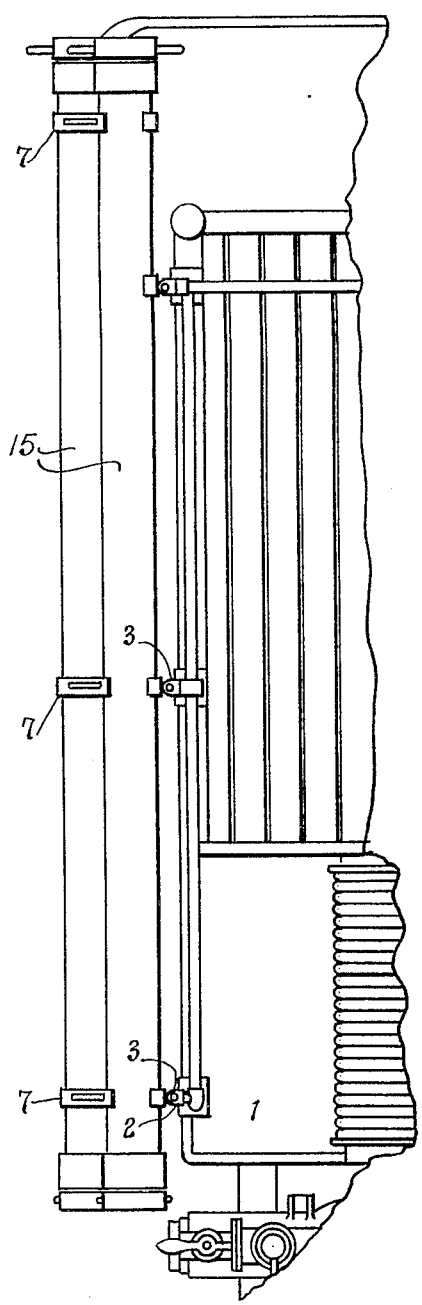
Figure 2 is a top plan view of one side of a truck body, showing applicant's improved suction hose supporting means and a pair of suction hose supported thereby.
Figure 3:
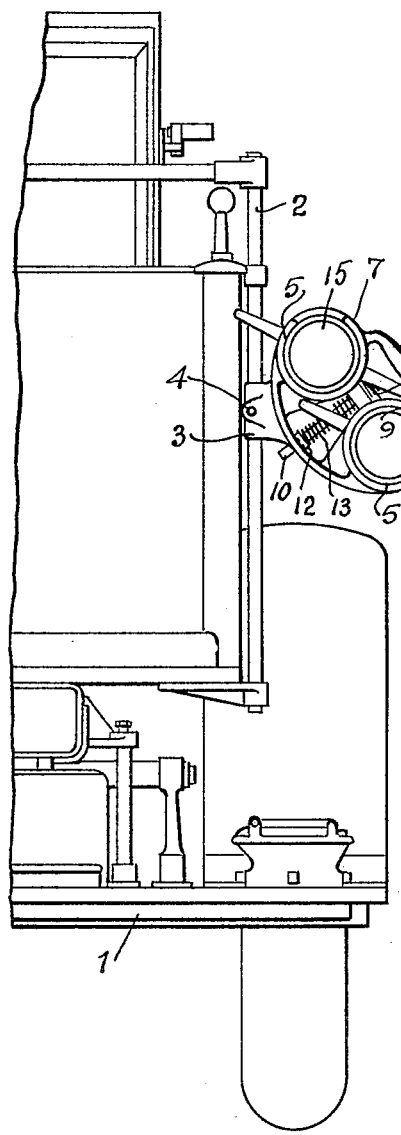
Figure 3 is a rear view of one side of a fire truck, showing applicant's improved hose supporting means thereon.
Figure 4:
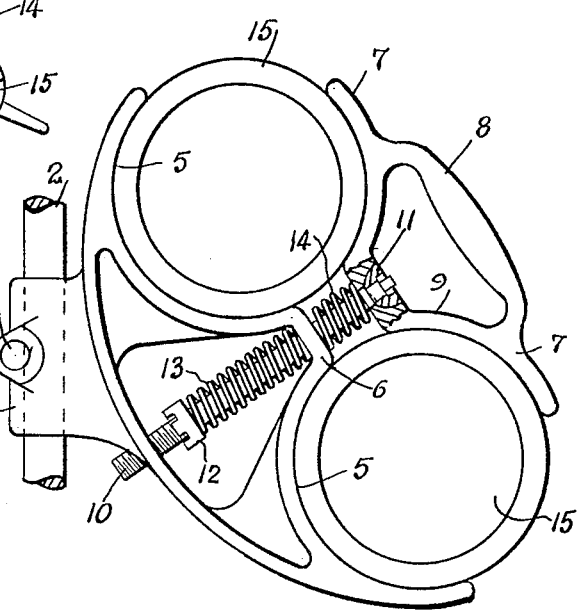
Figure 4 is an enlarged view of applicant's improved hose supporting apparatus, showing the manner in which it is attached to a post.

The present hose supporting apparatus may be attached to any hose truck or fire engine truck. In the present instance it is shown supported or attached to a body 1 of a fire truck, only a part of which is shown. At one side of the body is a plurality of posts 2, as shown in Figures 2 to 4. These posts are round.

Figure 1:
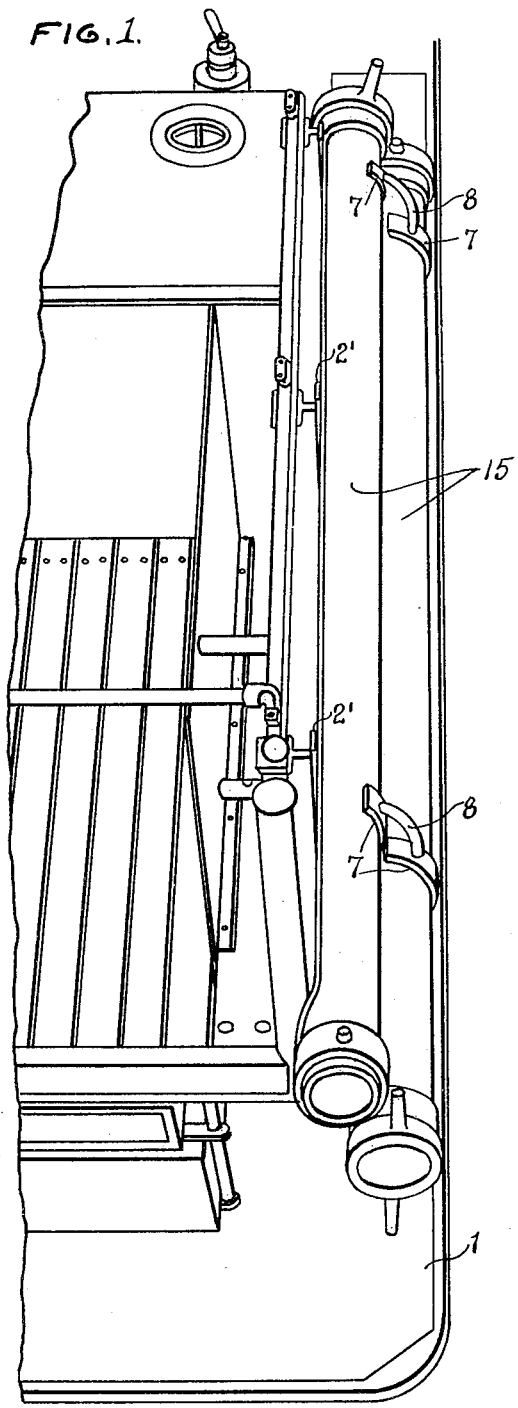
Figure 1 is a perspective view of one side and one end of a truck body, showing suction hose supported thereon.

Shown in Figure 1 are posts 2', which are square or flat in shape but serve as a support for brackets 3 for supporting applicant's hose clamps. These brackets may be attached to the posts in any suitable manner.

In Figures 3 and 4 they are shown attached to a round post by means of screws 4, which cause these brackets to be firmly gripped to the posts so that the clamping apparatus is held in position. These brackets may be adjusted vertically with relation to the posts so they may have different positions with regard to the posts. Also a plurality of brackets may be placed on each post so that more than two suction hose may be supported on one side of a truck.

On each bracket is an arc-shaped body, which has thereon two semi-circular seats 5 of sufficient size to receive suction hose and support them thereon. The outside of each seat is formed by a part of the arc structure, while between the two seats there is formed a yoke member 6 which constitutes the inner or adjacent sides of the seats. Supported on the yoke is a clamp consisting of two arms 7 extending over the parts 5 to form with these seats 5 gripping means for holding the suction hose in place. Between the two parts 7 is a handle 8 for operating the parts 7.

Curved inwardly from the parts 7 and forming part of the gripping members is a second yoke 9, which has extending therethrough a bolt 10 with a semi-spherical head 11 on the end thereof. This semi-spherical head rests in a semi-spherical slot in the yoke 9. This bolt extends through a hole in the yoke 6 and has on the end remote from the head a shoulder 12 which may be adjusted longitudinally of the bolt.

Between the shoulder 12 and the part of the yoke 6 through which the bolt extends is a spring 13, and between the yoke 6 and the yoke 9 is another spring 14. These springs cooperate with each other and with the yoke 6 in holding the parts 7 in clamping engagement with the suction hose when the suction hose is placed upon the seats 5. In Figures 3 and 4 two suction hose are shown clamped upon applicant's hose-supporting member. The hose in the present instance is indicated by the numeral 15.

When it is desired to remove the hose from the position shown in Figures 3 and 4 the handle 8 is seized and pressure is brought to bear so that the spring 13 is compressed. The handle is rotated 90 degrees. In this position the hose may be easily removed from the seats. When it is desired to place the hose in the seats the members 7 and 8 are at right angles to the position shown in these figures. In this position the hose may be easily placed on the seats. When the hose are placed on the seats the handle is turned so that the members 7 and 8 assume the position shown in these Figures 3 and 4, whereby the hose are held in position.

It will be understood that I desire to comprehend within my invention such modifications as come within the scope of my claims and my invention.

Having thus fully described my invention, what I claim as new and desire to secure by Letters Patent, is:

1. In a fire engine having posts thereon, a bracket adjustably attached to each post, a pair of arcuate hose seats on each bracket having therebetween a yoke, a clamp having a pin thereon extending through said yoke, and a spring on the pin on each side of the yoke, said clamp having arcuate members thereon cooperating with the seats to grip and hold hose sections.

2. In a hose support for fire trucks, a plurality of arc-shaped brackets, each having a centrally disposed yoke forming with the bracket arcuate seats, a bolt extending through the yoke, an adjustable shoulder on one end of the bolt, a clamp member swiveled to the other end of the bolt, and a spring on the bolt between the yoke and the shoulder and between the yoke and the clamp.

3. In a hose support for fire trucks, a bracket having a pair of arcuate seats, a rotatable spring-operated clamp attached to the bracket, and means comprising a pin extending through the bracket and a spring on the pin on each side of the bracket for attaching the clamp to the bracket, said clamp having a pair of arcuate arms cooperating with the seats to grip sections of a hose.

4. In a hose support for fire trucks, a bracket having a pair of arcuate seats, a pin member slidably supported by said bracket, spring means tending to hold said pin member in an inner position, a clamp swiveled to said member and cooperating with said seats to grip sections of a hose, and a spring between the clamp and the bracket.

5. In a fire engine, a bracket having a yoke thereon forming a pair of arcuate seats, a second yoke having a pair of arcuate gripping members cooperating with the arcuate seats for gripping purposes, a bolt swivelled at one end to the second yoke and extending through a hole in the first-named yoke, a spring on the bolt between the yokes, and a second spring supported between the first yoke and the other end of the bolt.

6. In a fire engine, a bracket having a yoke thereon forming a pair of arcuate seats, a second yoke having a pair of arcuate gripping members cooperating with the arcuate seats for gripping purposes, a bolt swivelled at one end to the second yoke and extending through a hole in the first-named yoke, a spring on the bolt between the yokes, a second spring supported between the first yoke and the other end of the bolt, and means acting on the bolt and the last-named spring tending to compress both springs.

In testimony whereof, I affix my signature.

CHARLES H. FOX.